Figure 3:
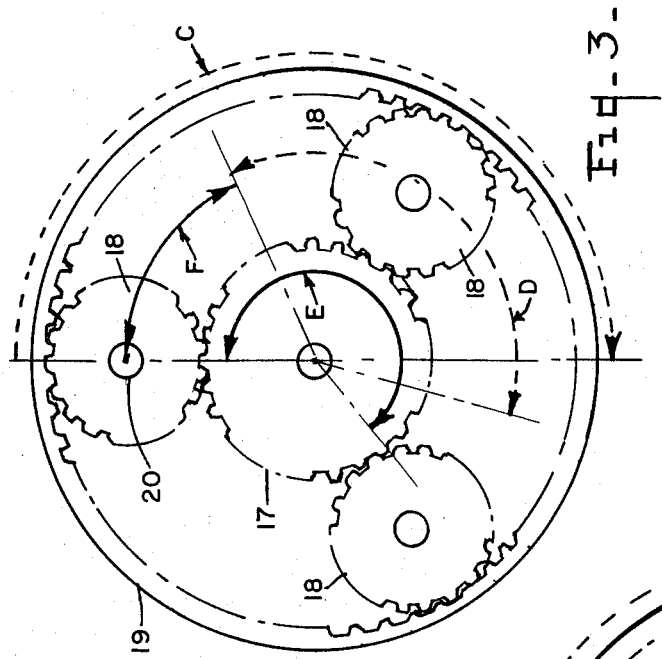

United States Patent [19]
Welch

[11] 3,712,154
[45] Jan. 23, 1973

[54] TRANSMISSION
[76] Inventor: Arthur L. Welch, Box 5, Wasilla, Alaska 99687
[22] Filed: Nov. 4, 1970
[21] Appl. No.: 86,752

[52] U.S. Cl. ................................... 74/688
[51] Int. Cl. ............................... F16h 47/08
[58] Field of Search ........................ 74/688

[56]           References Cited

UNITED STATES PATENTS

| 2,627,764 | 2/1953  | Mayner   | 74/688 X |
| 2,656,736 | 10/1953 | Ebsworth | 74/688 X |
| 3,191,459 | 6/1965  | Welch    | 74/688   |
| 3,292,455 | 12/1966 | Welch    | 74/688   |
| 3,507,168 | 4/1970  | Carp     | 74/688   |

FOREIGN PATENTS OR APPLICATIONS 1,222,696   6/1960   France ...................... 74/688

Primary Examiner—Arthur T. McKeon

[57]          ABSTRACT

An infinitely variable speed transmission having a hydraulic torque converter or other variable speed variable torque mechanism supplying reaction to a plurality of planetary gearsets arranged in series, output member of first gearset connected to input member of following gearset, with the power source that drives the torque converter also driving the first gearset input member. The first gearset always operates in split torque drive. All except the first gearset reaction members have one way brakes holding them from rearward rotation. Clutches between the gearset reaction members connect them together to give split torque drive in the gearsets following the first one. A formula for determining ratios in planetary gearsets operating in split torque drive is given.

1 Claim, 4 Drawing Figures

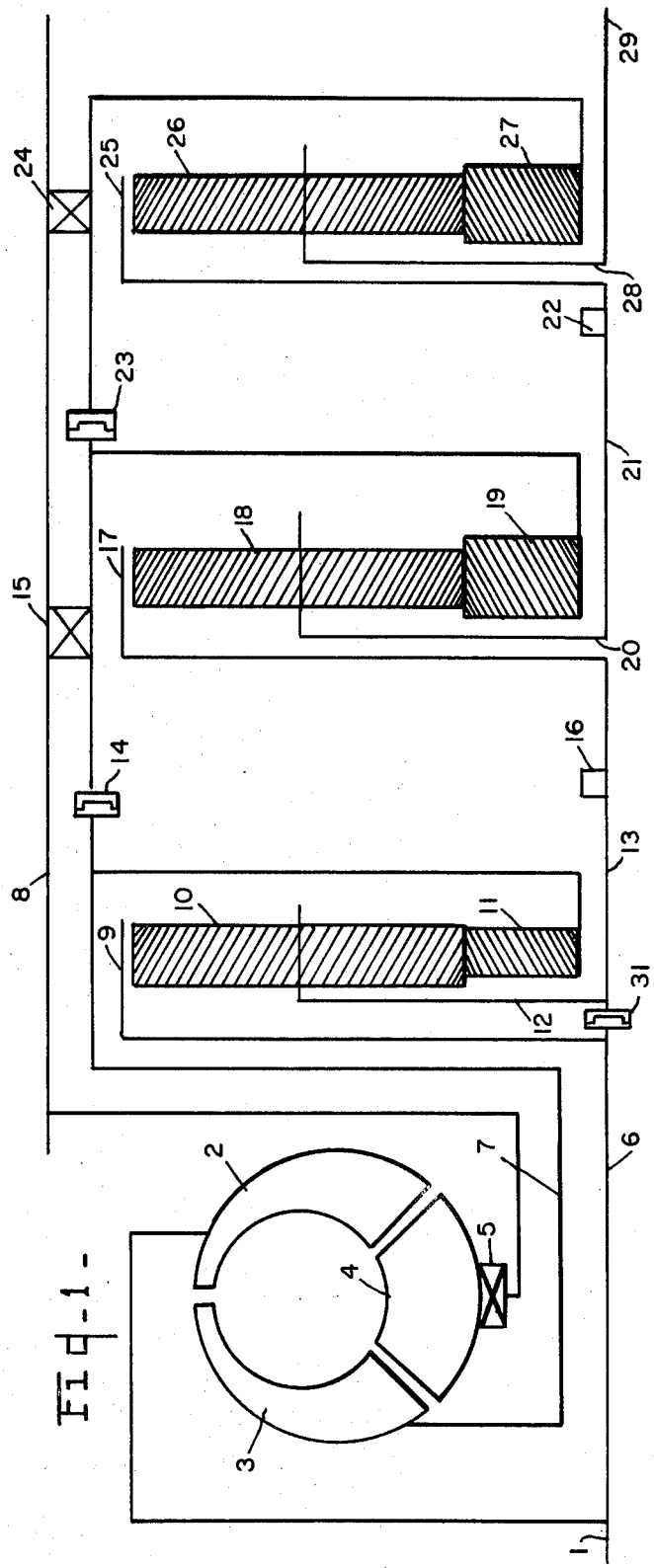

INVENTOR.

ARTHUR L. WELCH.

3,712,154

TRANSMISSION

This invention relates to hydrodynamic and planetary split torque transmissions and is an improvement of the transmission in my U.S. Pat. No. 3,292,455 which discloses direct driven shaft and a hydraulic torque converter supplying power to plurality of planetary gearsets connected in series and controlled by clutches and freewheels to form an infinitely variable speed transmission of wide versatility, though of rather complicated construction.

Since this simplification of the U.S. Pat. No. 3,292,455 Transmission is the main object of the present invention a brief explanation will be given here with more detail in the following parts of this Specification. This simplification, which eliminates a large part of the control apparatus of the U.S. Pat No. 3,292,455 transmission is possible because of the drop in ratio which occurs in the gearset when the gearset hydraulically driven member is rotated part of a turn by the hydraulic torque converter while the gearset input member is rotated one turn by the power source which drives the torque converter. Planetary gearsets, like all geared transmissions, have a driven or input member, a reaction member, and an output member. In split torque drives the input member is direct driven and the reaction member is driven by the hydraulic torque converter, so the reaction member becomes a hydraulically driven member. For example, when the hydraulically driven member of a gearset having a ratio of 3.6 turns of the input member to 1 turn of the output member is rotated one-half turn to each turn of the input member, the ratio of input member to output member is 1.6 to 1. Two gearsets of 3.6 to 1 ratio connected together with the reaction members at rest have a total ratio of 13 to 1. With the hydraulically driven members connected together and turning at one-half input member speed the ratio in the two gearsets is about 1.9 to 1. With three gearsets of 3.6 to 1 ratio connected together and all the hydraulically driven members locked and turning at one-half the first gearset input member speed, the ratio is only 2 to 1, though the ratio of three gearsets with hydraulically driven members at rest is 47 to 1. This is true because the output member of the first gearset turns about five-eights of a turn to each turn of the input member. The second input member, driven by the first gearset output member, thus turns only slightly faster than the locked hydraulically driven members which turn at one-half the first gearset input member speed. It is obvious that if the input and hydraulically driven members turned at equal speed the ratio of input to output would be 1 to 1. The ratio of input to output in the second gearset is about 1.2 to 1, so the ratio of first gearset input to second gearset output is 1.9 to 1. With three gearsets of 3.6 to 1 ratio, the ratio of input to output in the third gearset is only slightly greater than 1 to 1, because the input member, driven by the second gearset output member, turns only slightly faster than the hydraulically driven members, so the total ratio in the three gearsets is only slightly greater than 2 to 1. This will be explained in greater detail below.

The planetary gearsets of the invention can employ any of the epicyclic or hypo-epicyclic gear arrangements, as long as the output member turns in a forward direction and the gearset operates in a reduction of speed between the input and output members. In epicyclic arrangements, that is those with two sun gears and pinion gears in a carrier, there are the peripheral toothed sun and pinion gears and the bevel gear types, and in the hypo-epicyclic arrangements, which have a ring or annulus gear for the pinions to walk around inside, the ring gear reaction, sun gear input and the ring gear driving, sun gear reaction arrangements.

It is an object of the invention to use the gear arrangements named above to good and new advantage.

In the drawings:

FIG. 1 shows a hydraulic torque converter with ring gear driving, sun gear reaction, pinion gear carrier output gearsets.

Figure 4:
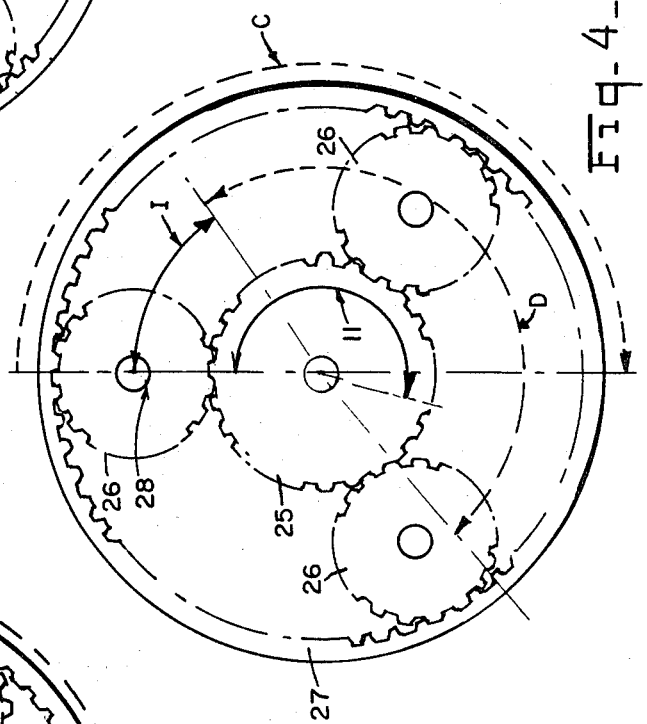
Figure 2:
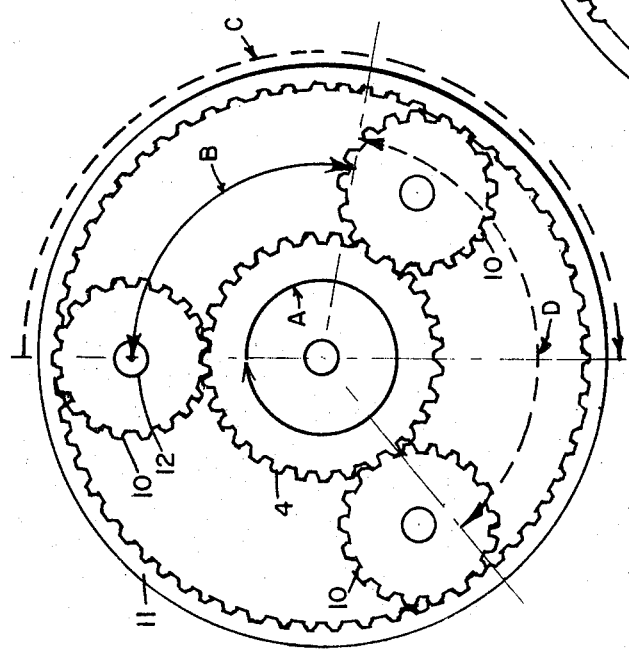

FIG. 2, 3, and 4 show percentages of a turn gearset members advance in gearsets operating in split torque drive.

In all the drawings parts which perform like functions have like numbers. That is 9, 17, and 25 are gearset input members, 10, 18, and 26 are pinion gears, 11, 19, and 27 are reaction members, 12, 20, and 28 are output members, 14 and 23 are reaction member connecting clutches, 15 and 24 are one way brakes, and 16 and 22 are governors.

The transmission embodies a hydraulic power train, driven by a torque converter which is a hydrodynamic mechanism, surrounding a direct drive power train. A plurality of planetary gearsets having input, hydraulically driven, and output members in each gearset forms both part of the hydraulic power train and the direct drive power train. The hydraulic power train consists of the hydraulically driven members of the planetary gearsets driven by a hydraulic mechanism. The direct drive power train receives power from a driving shaft 1 and first intermediate shaft 6 into the first gearset input member 9. The first gearset always operates in split torque drive, that is part hydraulic and part direct driven. The following gearsets are selectively operable in either direct drive, which gives maximum gear reduction, or in split speed variable torque ratios. Actuating means for operating the following gearsets in either direct or split torque drive consists of one way brake means 15 and 24, and connecting clutches 14 and 23, with clutch 31 giving direct drive in all the gearsets operating in split torque drive when it is engaged. Governors 6 and 22, which are centrifugally operated are the control means for the actuating means named above.

In FIG. 1 the variable speed variable torque mechaniam shown is a single stage hydraulic torque converter driven by driveshaft 1. The impeller 2 or pump 2 centrifugally impels fluid, normally oil, outward into the ends of the turbine 3 vanes which are arcuately shaped to absorb power from the fluid. When the turbine 3 is turning at a slower speed than the impeller 2 the fluid strikes the vanes 3 at a sharper angle than when the turbine 3 speed nearly matches impeller 2 speed, thus imparting more force so torque multiplication occurs. When the fluid passes thru the turbine 3 it reaches stator 4 which is held from rearward rotation by freewheel 5. Stator 4 redirects the fluid to reenter impeller 2 at a favorable angle so no cavitation occurs, and the fluid cycle is complete. Other types of hydraulic torque converters are presently known, but the operating principle is essentially as stated above. The planetary gearsets shown in FIG. 1 are of the ring gear driving, sun gear reaction carrier output arrangement. Power from driveshaft 1 is transmitted through intermediate shaft 6 to first gearset ring gear 9. Power from turbine 3 is transmitted by hollow shaft 7 to sun gear 11 to provide hydraulic driven to pinion gears 10 which are in meshing engagement with ring gear 9 and sun gear 11. Pinion gear carrier 12 transmits the combined hydraulic and mechanical power collected in the first gearset through intermediate shaft 13 to second gearset ring gear 17. Sun gear 19 is held from rearward rotation by one way brake 15 and provides reaction to pinion gears 18 which mesh with sun gear 19 and ring gear 17. The purely mechanically multiplied power output of the second gearset is transmitted by pinion gear carrier 20 through intermediate shaft 21 to third gearset ring gear 25. Reaction is provided by sun gear 27 which meshes with pinion gears 26 which mesh with ring gear 25. Sun gear 27 is held from rearward rotation by one way brake 24. The transmission power output is transmitted by carrier 28 to driven shaft 29. When the load on shaft 29 is such that the torque converter turbine 3 can accelerate hydraulically driven sun gear 11 to a predetermined speed, usually near matched speeds of impeller 2 and turbine 3, the centrifugally actuated governor 16 riding on intermediate shaft 13 admits oil under pressure to clutch 14 and causes clutch 14 to engage, transmitting turbine 3 power to second gearset reaction member 19. The combined hydraulic and mechanically multiplied power of the first and second gearsets is transmitted by shaft 21 to third ring gear 25. This power is mechanically multiplied in the third gearset and transmitted by the driven shaft 29 to the load. When the load is overcome enough so the trubine 3 can accelerate the first and second sun gears 11 and 19, locked together by clutch 14, the centrifugal governor 22 riding on shaft 21 admits oil under pressure to clutch 23 and causes clutch 23 to engage connecting sun gear 27 to sun gears 11 and 19, and effecting split torque driven in the whole transmission. Split torque drive is thus effected because the power going through the torque converter turns the reaction members 11, 19 and 27, which are locked together as stated above, and power from drive shaft 1 turns the first input member 9 and is carried on back to second input member 19 and third input member 27 by the intermediate shafts 13 and 21, and to driven shaft 29. How this action is accomplished is explained in the following part of the specification, and a formula for determining what happens is given.

In the variable speed variable torque mechanism of FIG. 1, namely the hydraulic torque converter described above, the impeller 2 serves as input member, the turbine 3 as output member, and the stator 4 and freewheel 5 as ratio changing mechanism.

In the actuating means of the transmission, namely one way brakes 15 and 24, and clutches 14 and 23, the one way brakes are generally known as freewheels. The freewheel has the virtue of positively holding a load from rotation in one direction, yet allowing free and instant override in the other direction. The freewheels can and might desirably be replaced by band brakes or disc brakes actuated by servo means, not shown. The preferred clutches 14 and 23 of the transmission are of the servo operated type where discs keyed to a drum are interleaved and overlapped with friction plates keyed to another drum. The servo mechanism, not shown, is operated by oil under pressure and pinches the discs and plates together to transmit power between the two drums, which are attached to the driving and driven devices.

The control mechanism, shown only as a symbol denoting centrifugal governors, can be mechanical, electrical, or hydraulic in the control operation. The coaxial alignment of all transmission power train components lends itself to hydraulic control since the common axis of the center shafts can be drilled to conduct oil from one end of the transmission to the other for control as will as lubrication purposes. The hydraulic governors, of which several types are presently well known, have a centrifugally actuated flyweight type valve which admits oil under pressure to passages, not shown, leading to the hydraulically operated clutches 14 and 23.

As stated above, when the reaction member of a planetary gearset is rotated part of a turn while the input member is rotated one turn, the ratio of the gearset or the number of turns of the input member required to effect one turn of the gearset output member with the reaction member at rest, drops. Since the power used to turn the hydraulically driven drive train and the input member drive train generally comes from the same source, the transmission system is called split torque or dual path drive. When applicant originally thought of split torque drives he took planetary gearsets and manually turned the various members and observed the input to output ratios with different percentage of turn of the hydraulically driven member. He found that the drop in ratio as the hydraulically driven member was turned faster relative to the input member closely matched the drop in torque multiplication which occurs in hydraulic torque converters when the turbine, or output member, is accelerated in relation to impeller, or input member, speed. It follows that the torque converter can be used to supply hydraulic drive to planetary gearsets, and any other mechanism having similar action to a torque converter, that is variable speed variable torque output, could also be used. Applicants first experiments with the split torque principle resulted in filing U.S. Pat. application Ser. No. 96,431 and other applications, either long since abandoned or matured into my U.S. Pat. No. 3,191,459 and 3,292,455. Hydraulic torque converters handle large amounts of power, at about 80 percent efficiency when operating in torque multiplying drive. The 20 percent or move efficiency loss is well repaid in ease of operation and decreased maintainance costs. With half the avaiable power going through the torque converter and half going directly through gearsets the efficiency loss can be cut nearly in half, and possibly to advantage, since some gearing is always needed with torque converters.

As explained under FIG. 2 above, the control mechanism of the transmission must be designed so the total ratio of input to output of gearsets operating in split torque drive does not exceed the ratio of one gearset, considering that all gearsets will likely be of the same ratio. The first two gearset reaction members must always be maintained above one-fourth input member speed or the total ratio will overcome the variable speed variable torque mechanism.

With positive control of the variable speed variable torque mechanism output speed the right speed to attain the correct ratio is easily determined. When a pair of reaction members is connected together the variable speed variable torque mechanism output is slowed so the ratio of the two gearsets is the same as the ratio of the gearset of which the reaction member has just been connected. The ratio of the total transmission is therefore the same as it was before the change in the power train, and any acceleration of the load is stepless and infinitely varied.

The 3.6 ratio gearsets cited as examples above were used because of availability and because of the sharp contrast observable. It is hard to see any practical use for a transmission of the 13 to 1 mechanical ratio two gearsets would have, plus whatever multiplication the first gearset operating in split torque drive gives.

Of more practical interest is the ratio obtained with gearsets of 2 to 1 ratio much as in bevel gears where the sun gears are of equal size. It is obvious that the hypo-epicyclic arrangements cannot have input and reaction members, that is sun and ring gears, of the same size, which are necessary for 2 to 1 ratio.

An empirical formula for calculating rations in planetary gearsets operating in mechanical drive, with reaction members at rest, is: divide the number of teeth in the input member into the number of teeth in the reaction member, and add one turn. The extra turn accumulates from the walking around of the pinion gears between the input and reaction members when the pinion carrier rotates, which said carriers must do for split torque drive.

An empirical formula for calculating ratios in split torque drives, with reference to FIGS. 2, 3, and 4 is: find the percentage of a turn, shown as B in FIG. 5, which the output member 12 advances when the input 9 is rotated 1 turn with reaction 11 at rest. Find the percentage of a turn, shown as D in FIG. 2, which the output 12 advances when reaction 11 turns one-half turn, shown as C. Add B+D together and divide into 1 to get the ratio. When two gearsets are connected in series, take sum B+D of FIG. 2, the first output 12 advance and also input E of FIG. 3, in percentage, and multiply E by the percentage B of FIG. 2. This product, shown as F in FIG. 3, is smaller than output advance B of FIG. 2 because the second input 17 is driven by first output 12 of FIG. 2, which turns slower than first input 9. The output 20 advance F plus amount D which output 20 advances from turning reaction 19½ turn C divide into 1 gives the ratio of second input 17 to second output 20. In a third gearset, the input amount H of FIG. 4 is multiplied by the output advance B of FIG. 2 to get output advance I of FIG. 4. I+D is the total amount of output 28 advance in FIG. 4, so dividing I+D into 1 gives the ratio in the third gearset and in the transmission.

The ratio between input and output decreases much faster in gearsets of great reduction than in those of small reduction. Three examples: three gearsets of 3.6 to 1 ratio operating with reaction members at rest requires 47 turns first input member to 1 turn third gearset output member. With reaction members locked together and turning at one-half first input member speed-in split torque drive-the ratio is 2 to 1. The ratio of three 2 to 1 ratio gearsets with reaction members at rest is 8 to 1, in split torque drive, reaction members turning at one-half input speed, the ratio is 1.78 to 1. Three gearsets of 1.54 ratio with reaction members at rest is 3.65 to 1, in split torque drive, reaction speed one-half input speed, the ratio is 1.56 to 1.

This marked difference in ratio can probably best be explained by saying that the gearsets are being driven from both ends in split torque drive, that is from the small ratio end as well as the large ratio end. When the small ratio end is the reaction member, any increase in relative driving speed has a marked effect.

In a sun gear driving, ring reaction arrangement not shown is an example of this and the 3.6 ratio gearsets cited above show it well. In gearset -gearset the sun gear has 20 teeth and the ring gear 52 teeth, so with sun gear driving, ring gear at rest the ratio is 52 divided by 20, plus 1 turn, or 3.6 to 1. With ring gear driving, sun gear at rest the ratio is 20 divided by 52, plus 1 turn or 1.38 to 1.

In FIGS. 2, 3, and 4, drawn to the 3.6 ratio gearsets, the solid line arcs A, E, and H show how much input members 9, 17, and 25 are turned, and solid line arcs B, F, and I show how much output members 12, 20, and 28 advance from turning the related input member. The dotted line arcs C, in all Figures, show one-half turn of reaction members 11, 19, and 27, and dotted line arcs D, in all Figures, show how much output members 12, 20, and 28 advance from turning the related reaction member. One turn of input member 9, shown as A, causes 0.28 turn B of output 12. For one-half turn of each reaction member, shown as C, output members 12, 20, and 28 each advance 0.36 turn D.

In the first gearset, FIG. 2, the output 12 advances 0.28 turn B+0.36 turn D equals 0.64 B+D divided into 1 equals 1.56, the ratio in the first gearset.

The second gearset output 20 of FIG. 3 advances 0.64 E times 0.28 B equals 0.18 F+0.36 D equals 0.54 F+D divided into 1 equals 1.85 the ratio in the second gearset.

The third gearset output 28 of FIG. 3 advances 0.54 H times 0.28 B equals 0.15 I+0.36 D equals 0.51 I+D equals 1.98 ratio in the third gearset and in the transmission.

The calculations just given agree very closely with the example cited at the start of this Specification, before the formula for calculating ratios was evolved. Ratios in the example were obtained by manually turning gearset members of gearsets connected in series as described, and visually observing the ratios.

In bevel gears with equal size sun gears the calculations are much easier because the carrier advances the same for both input and reaction members, at a rate of one-half the sun gears' rotation. So we get one-half turn B output advance for 1 turn A of input member, plus one-fourth turn D output advance for one-half turn C of reaction member, or three-fourths turn B+D. 1 divided by three-fourths equals 1 ⅓ turns input to 1 turn output in the first gearset. In the second gearset the output is advanced three-eighths of a turn F by the input turning amount E, driven by first output member 12, plus one-fourth turn output advance D from turning the reaction member one-half turn C, equals five-eighths turn F+D, so 1 divided by 0.62 ratio in the second gearset. The third output is advanced one-half the second output member rate, or five-sixteenths turn I added to the one-fourth output advance D from turning third reaction member one-half turn C equals nine-sixteenths turn I+D. So 1 divided by 0.56 equals 1.78, the ratio of the first input to third output member.

To apply the formula decimally to the calculations for the 2 to 1 ratio gearsets just given, in the first gearset arc B is 0.50 which compares to .28 B in the 3.6 gearsets, shown in FIG. 2, so 0.50 B × 0.75 E equals 0.375 or three-eighths F as stated for the second gearset. In the third gearset 0.50 B × 0.625 H equals 0.312 or five-sixteenths I as stated.

Ratios calculated for a ring gear input, sun gear reaction gearset arrangement having 39 ring gear teeth and 21 sun gear teeth, giving a ratio of 1.54 to 1, with reaction members turning one-half the first gearset input member speed are: first gearset 1.22 to 1, second gearset 1.44 to 1, and third gearset 1.56 to 1. The rate of increase from gearset to gearset is nearly even in this arrangement and only about one-half turn less than one-half the total ratio for three gearsets.

Using the three 2 to 1 ratio gearsets with varying rates of reaction member rotation, the following is obtained: one-fourth turn — 2.86 to 1, one-third turn — 2.44 to 1, one-half turn — 1.78 to 1, and three-fourths turn — 1.28 to 1, all first input to third output member ratios. It is noted that the ratio at one-half turn reaction member is less than one-fourth the ratio with reaction members stationary — 8 to 1.

In FIG. 1 clutch 31 is placed between input member 9 and output member 12 of the first gearset and locks them together when engaged, thus effecting direct drive between driveshaft 1 and intermediate shaft 13, which transmits the output of the first gearset to the second gearset input member. Clutch 31 is controlled by means, not shown, other than governors 16 and 22, so any gearsets operating in split torque drive, which always included the first one, are placed in direct drive when clutch 31 is engaged. That is when clutch 31 is engaged the split torque gearsets operate in positive 1 to 1 drive, driven directly by driveshaft 1, because when reaction member connecting clutches 14 and 23 are engaged the first second, and third gearset reaction members are locked and since the first gearset is locked in direct drive all gearsets are locked in direct drive and move as one. Thus the first gearset can operate in direct drive with the following gearsets in mechanical reduction, or first and second gearsets in direct drive, when clutch 14 is engaged, with third gearset in mechanical reduction, or with all gearsets in direct drive when both blutches 14 and 23 are engaged. With the hydraulic torque converter of FIG. 1 no other modification of the transmission is necessary to get this direct drive.

I claim as my invention an improvement.

I claim:

1. In a hydrodynamic and planetary split torque transmission; a transmission case housing in coaxial alignment a driving shaft, a driven shaft, a direct drive power train arranged between said shafts and a hydraulic power train surrounding said direct drive power train; said power trains including a plurality of planetary gear sets, the first of said gearsets having a direct driven member, a hydraulically driven member, and an output member, each following gearset having a direct driven member, a reaction member adapted to be hydraulically driven, and an output member; said direct drive power train including power transmitting means connecting said driving shaft to the first gearset direct drive member, and power transmitting means connecting each gearset output member to the following gearset direct driven member, said driven shaft being connected to the last gearset output member, and brake means between said transmission case and each following gearset reaction member; said hydraulic power train including a hydraulic torque converter having an impeller, a turbine, and reactor means, said reactor providing variable speed variable torque drive between said impeller and said turbine, power transmitting means connecting said turbine to the first gearset hydraulically driven member, connecting clutch means for transmitting hydraulic power from the first gearset hydraulically driven member to the following gearset reaction member, and connecting clutch means for transmitting hydraulic power from the preceding gearset hydraulically driven member to the following gearset reaction member, each of said brake means being overridden when the associated gearset hydraulically driven member connecting clutch is engaged; and control means for controlling said reaction member brake means and said hydraulically driven member connecting clutch means, said control means effecting part direct drive, part hydraulic drive in the affected gearsets and maximum reduction in the following gearsets, and effecting a continuously and infinitely variable change of ratios from maximum reduction to split torque drive in all gearsets; said control means including governor means arranged to control said gearset reaction member brake means and said hydraulically driven member connecting clutch means sequentially from front gearset to rear gearset.

* * * * *